United States Patent [19]

Hidaka et al.

[11] 4,453,803

[45] Jun. 12, 1984

[54] OPTICAL WAVEGUIDE FOR MIDDLE INFRARED BAND

[75] Inventors: Takehiko Hidaka, Ibaraki; Takitaro Morikawa, Sayama; Junichi Shimada; Ken Kumata, both of Ibaraki, all of Japan

[73] Assignees: Agency of Industrial Science & Technology; Ministry of International Trade & Industry, both of Tokyo, Japan

[21] Appl. No.: 371,809

[22] Filed: Apr. 26, 1982

[30] Foreign Application Priority Data

Jun. 26, 1981 [JP] Japan .................................. 56-99525
Dec. 14, 1981 [JP] Japan .................................. 56-201180

[51] Int. Cl.³ ............................................. G02B 5/172
[52] U.S. Cl. ............................... 350/96.32; 350/96.34
[58] Field of Search ................ 350/96.30, 96.32, 96.34

[56] References Cited

U.S. PATENT DOCUMENTS

| 3,583,786 | 6/1971 | Marcatili | 350/96.32 |
| 4,067,709 | 1/1978 | Stanton | 350/96.32 X |
| 4,068,920 | 1/1978 | Bass et al. | 350/96.32 X |
| 4,194,808 | 3/1980 | Marhic et al. | 350/96.32 |

*Primary Examiner*—John D. Lee
*Attorney, Agent, or Firm*—Kurt Kelman

[57] ABSTRACT

An optical waveguide for transmission of light in the middle infrared band is produced by having its clad part formed of glass consisting preponderantly of germanium dioxide and its core part left unfilled.

3 Claims, 8 Drawing Figures

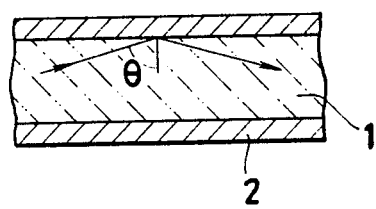
Fig_1
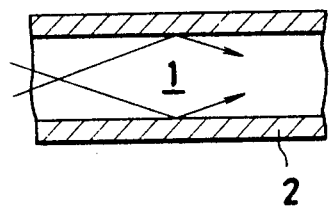
Fig_3
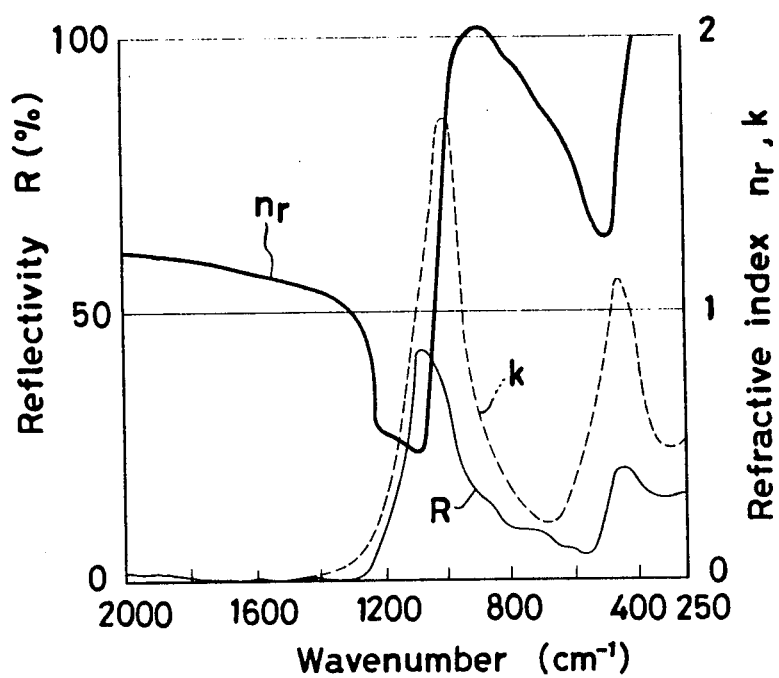
Fig_2

OPTICAL WAVEGUIDE FOR MIDDLE INFRARED BAND

BACKGROUND OF THE INVENTION

This invention relates to an optical waveguide for the middle infrared band.

The $CO_2$ gas laser which emits light in the middle infrared band region in the neighborhood of 10 μm is widely used for laser machining because of high efficiency and relatively low cost. The main body of this laser has a fairly large size of at least 1 meter and requires use of high voltage and cooling water. It has been customary, therefore, for the laser beam to be transmitted from the main body of the laser to the point of laser machining by means of a mirror waveguide system. The mirror waveguide system for the transmission of light is complicated in construction and difficult to handle. Increasing interest, therefore, is being attracted by the optical fiber which is easy to handle. In the adoption of the optical fiber for the transmission of $CO_2$ laser light, it is only natural that the core material of the optical fiber should cause as low loss of light at the aforementioned wavelength as permissible. For the wavelength of 10.6 μm, for example, alkali halides (such as NaCl and KBr), silver halides (such as AgBr), and thallium halide (such as KRS-5) may be cited as advantageous materials for the core. These core materials, however, are not easily vitrified and they are deficient in fabricability. Besides, they permit no ready formation of the two-layer construction of core and clad, lack mechanical, thermal, and chemical stability, yield readily to entry of impurities, and easily lose transparency. These drawbacks have prevented the materials from finding utility in practical applications. Moreover, a $CO_2$ gas laser which emits a high-energy beam has a disadvantage that the input and output terminal faces of the fiber are easily broken by the beam to induce the problem of discharge breakdown. To date, the transmission of light of the middle infrared band by the optical fiber has been found infeasible.

Primarily for the purpose of eliminating the restrictions imposed as described above on the conventional optical fiber for the $CO_2$ gas laser, the inventors have proposed a novel optical waveguide based on an entirely new principle. To facilitate the comprehension of this invention, this optical waveguide will be briefly described below. If a given material has a refractive index $n_r$ smaller than 1 at the working wavenumber of $CO_2$ laser light of 940 cm$^{-1}$ for example, a light obliquely incident upon this material (which is assumed to have an amply smooth surface) can be expected to be totally reflected. If a clad is made of this material with a hollow core embraced therein and a light of a wavenumber of 940 cm$^{-1}$ is injected into this hollow-core waveguide, then the optical wave of the light can be guided with amply low loss. The inventors examined numerous materials to find a material possessing such characteristics. They have consequently found that glass formed preponderantly of $SiO_2$ possesses a refractive index smaller than 1 in the middle infrared band. For the wavenumber of 940 cm$^{-1}$ of the beam generated by the $CO_2$ gas laser, however, the hollow-core waveguide produced by using this material has too large loss for the waveguide to prove thoroughly feasible.

Japanese Patent Application Disclosure No. SHO 51(1976)-9843 discloses a hollow pipe made of quartz in a construction such that a light of high intensity such as a laser beam can be guided thereby when the light is injected at an angle chosen to cause total reflection of the light on the inner wall surface of the pipe. This disclosure, however, makes no specific mention at all of the wavenumber of the light to be guided, the refractive index of the material to be used, the angle of incident light to the hollow pipe, etc.

SUMMARY OF THE INVENTION

An object of this invention is to provide an optical fiber for use in the middle infrared band, which optical fiber has adaptability to wavelength of the light to be guided thereby and permits minimization of the transfer loss of the light.

Another object of this invention is to provide an optical fiber for use in the middle infrared band, which optical fiber is formed easily and has excellent endurance with respect to the high-energy beam.

To accomplish the objects described above according to the present invention, there is provided an optical fiber for the middle infrared band which has the core part left unfilled and the clad part formed of glass consisting preponderantly of germanium dioxide. The refractive index of this optical fiber with respect to the light of the middle infrared band is lowered to less than 1 by forming the clad part of the optical fiber with the glass which consists preponderantly of germanium dioxide. Further, by addition of suitable amounts of potassium oxide and zinc oxide to germanium dioxide as the raw material for the glass, the wavenumber of the light for which the optical fiber best functions can be controlled within a certain range and, as a result, the transmission loss can be minimized.

The other objects and characteristics of the present invention will become apparent from the further disclosure of this invention to be made hereinbelow with reference to the accompanying drawings.

BRIEF DESCRIPTION OF THE DRAWINGS

FIG. 1 is an explanatory view illustrating the condition of light guidance through the conventional optical waveguide of the two-layer construction.

FIG. 2 is a graph showing the relation between the wavenumber of light and the reflectivity and refractive index of fused silica.

FIG. 3 is an explanatory view illustrating the condition of light guidance through the hollow-core optical waveguide.

DESCRIPTION OF PREFERRED EMBODIMENT

Figure 4:
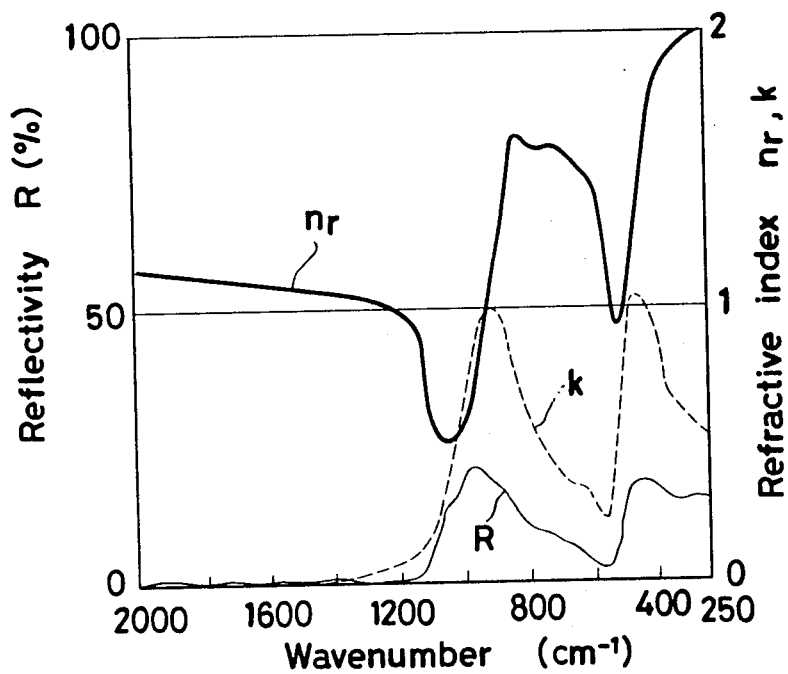
FIG. 4 is a graph showing the relation between the wavenumber of light and the refractive index of lead glass.

To aid in the comprehension of the present invention, the condition of light transmission by the conventional optical fiber of the two-layer construction consisting of a core part and a clad part will be described. In FIG. 1, a core part 1 is assumed to have a refractive index $n_0$ and a clad part 2 a refractive index $n_1$. Generally, the relation $n_0 > n_1 > 1$ (refractive index in vacuum or air) is satisfied. Optogeometrically, since the electromagnetic field (light) in the core part 1 satisfies $n_0 > n_1$ along the boundary with the clad part 2, it is totally reflected when the angle of its incidence $\theta$ exceeds a certain level. The light, accordingly, is transmitted to a distant place as entrapped within the core part 1, with the result that it is transmitted with low loss in its undiffused state. If the clad part is made of a material whose refractive index $n_1$ is smaller than the refractive index of air or vacuum and the core part is formed of air or vacuum whose refractive index $n_0$ is 1, the optical waveguide made of these clad and core parts ought to fulfill the same function as the ordinary core-clad type optical waveguide according to the aforementioned principle ($n_0 > n_1$)

The inventors continued a study on the basis of this idea. They have consequently made the following discovery.

Let $\omega$ stand for frequency, and the refractive index $n(\omega)$ and the attenuation coefficient $\alpha(\omega)$ are correlated as indicated by the following formula, wherein c stands for velocity of light.

$$n(\omega) = 1 + \frac{c}{\pi} \int_0^\infty \frac{\alpha(\omega_i)}{\omega_i^2 - \omega^2} d\omega_i$$

In the case of a 10 $\mu$m band, for example, there exists a resonance pattern in which the parameter $\alpha$ rises to its peak at a certain wavelength $\omega_0$ and damps on both sides of this wavelength. When the attenuation coefficient $\alpha(\omega)$ which answers this description is substituted in the formula, the refractive index $n(\omega)$ can become smaller than 1 at a slightly higher frequency than the aforementioned frequency $\omega_0$.

On the basis of this knowledge, the inventors sought the value of the refractive index $n_r - ik$ of fused silica $SiO_2$ in the infrared region by actually measuring the reflectivity R and calculating $n_r$ and k in accordance with the wavenumber dependency of the reflectivity R. The results were shown in FIG. 2. Here, $n_r$ denotes the real number part of the refractive index $n_1$ namely $n(\omega)$ in the aforementioned formula, and k denotes the imaginary number part, namely $k = \alpha \cdot c / 2\omega$.

It is noted from FIG. 2 that the refractive index of fused silica certainly is smaller than 1 where the wavenumber of the real number part $n_r$ of the refractive index is in the range of from 1,040 cm$^{-1}$ (equivalent to 9.615 $\mu$m of wavelength) to 1,300 cm$^{-1}$ (equivalent to 7.692 $\mu$m). When a clad part 2 alone is formed of this material and a core part 1 is left unfilled as illustrated in FIG. 3, an electromagnetic wave (light) having a wavelength in the range of 9.615 $\mu$m to 7.692 $\mu$m can be expected to be transmitted with low loss as confined within the hollow core 1 according to the aforementioned principle of total reflection.

By performing the aforementioned actual measurement of the reflectivity R on various materials, the wavelength ranges applicable to the various materials can be determined. Conversely, there can be adopted a design technique of screening out materials which satisfy the principle, $n_r < 1$, with respect to the wavelength desired to be used. The graph of FIG. 2 clearly shows that the band in which the refractive index of fused silica is smaller than 1 is that having wavenumbers in the range of 1040 cm$^{-1}$ to 1300 cm$^{-1}$. Therefore, fused silica is not suitable for use as a material for an optical fiber for the $CO_2$ gas laser beam having the wavenumber of 940 cm$^{-1}$. A search for materials which satisfy $n_r < 1$ for the particular wavenumber 940 cm$^{-1}$ reveals that a lead glass consisting of 25% of lead oxide (PbO), 20% of an alkali oxide (such as $Na_2O$ or $K_2O$), and the balance to make up 100% of silica answers the description. The curve representing actually found values of this lead glass is shown in FIG. 4. It is noted from FIG. 4 that the real number part $n_r$ of the refractive index of this particular material is smaller than 1 where the wavenumber is in the range of 930 cm$^{-1}$ (equivalent to about 10.75 $\mu$m of wavelength) to 1,200 cm$^{-1}$ (equivalent to about 8.3 $\mu$m). The wavenumber, about 940 cm$^{-1}$, of the $CO_2$ gas laser beam, therefore, is embraced within this range. When the hollowcore optical waveguide illustrated in FIG. 3 is constructed by forming the clad part thereof with this lead glass, it will provide effective transmission of the $CO_2$ gas laser beam with low loss.

Figure 5:
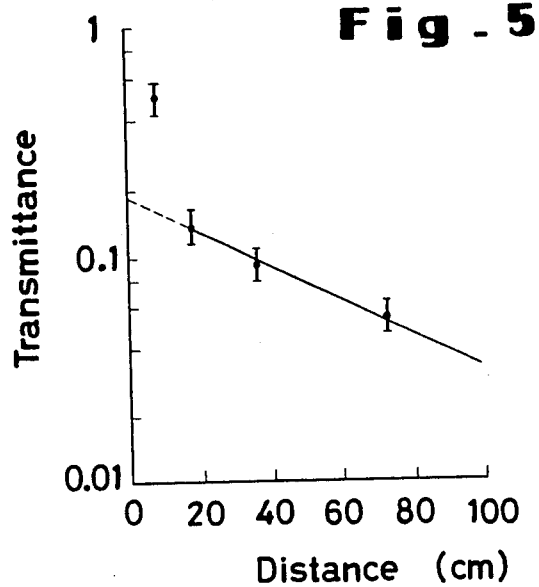
FIG. 5 is a graph showing the relation between the distance and the transmittance in the transmission of the $CO_2$ gas laser beam through the optical waveguide using lead glass in the clad part thereof.

An optical waveguide of a construction such that the inner diameter at the inlet opening was 3 mm, the inner diameter at the outlet was 1 mm, the inside diameter 3 mm of the inlet opening was converged to 1 mm over a distance of 20 mm, and the distance from the inlet opening to the outlet was 100 cm was formed by using a lead glass of the aforementioned composition. A laser beam of a wavenumber of 940 cm$^{-1}$ emitted from a $CO_2$ gas laser was transmitted through this optical waveguide to determine transmission loss. The results are shown in FIG. 5. It is noted from FIG. 5 that the transmission loss was about 7.7 dB/m and that the transmission ratio fell below 0.1 at a position 40 cm from the inlet. With such data, the optical waveguide hardly proves useful for the transmission of $CO_2$ gas laser beam. To be specific, the transmission loss of the optical waveguide is affected mainly by the imaginary number part k of the refractive index. When the real number part $n_r$ and the imaginary number part k of the refractive index are both small, the transmission loss of light having that wavenumber becomes small. Lead glass has a real number part $n_r$ of less than 1 and an imaginary number part k of a relatively large value of the refractive index in the band region of from 940 cm$^{-1}$ which is the wavenumber of the $CO_2$ gas laser beam to 1000 cm$^{-1}$. In this case, the transmission loss in the aforementioned band region of the wavenumber becomes high and, therefore, lead glass is not suitable for use as a material for an optical fiber for the transmission of the $CO_2$ gas laser beam.

The inventors continued their search for a material whose real number part $n_r$ of the refractive index relative to the light in the middle infrared band was smaller than 1. They have consequently found that glass formed preponderantly of germanium dioxide meets the purpose mentioned above.

Figure 6:
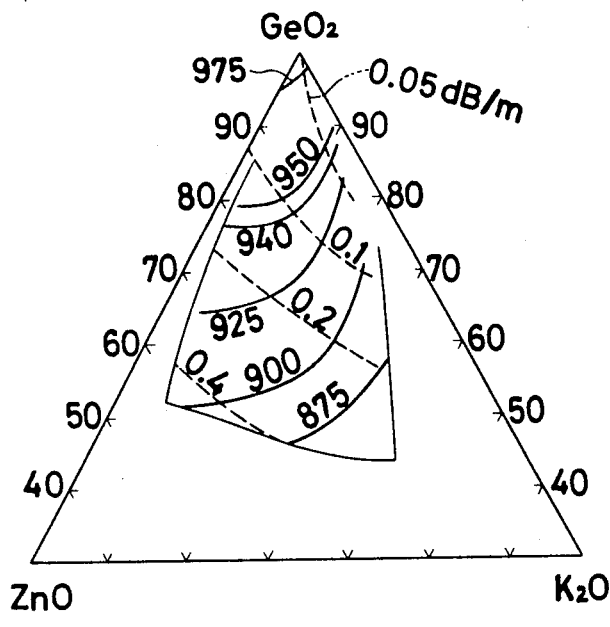
FIG. 6 is a graph showing the relation between the percentage composition of the three components, i.e. $GeO_2$ as the main component for glass and ZnO and $K_2O$ as additives thereto, and the wavenumber for the lowest transmission loss of light through the optical waveguide of the present invention.

Pure germanium dioxide glass is such that with a hollow-core waveguide made of this glass, the wavenumber which gives the lowest possible transmission loss is 975 cm$^{-1}$. This value does not coincide with that of the $CO_2$ gas laser beam (940 cm$^{-1}$). Equalization of the wavenumbers is accomplished by adding to the pure germanium dioxide certain metal oxides. In this case, potassium oxide ($K_2O$) proves to be most effective in this equalization. When $K_2O$ is added to the germanium dioxide glass, the wavenumber which represents the minimum of transmission loss can be shifted past 940 cm$^{-1}$ up to about 850 cm$^{-1}$ as the amount of $K_2O$ thus added increases. When $K_2O$ alone is added beyond a certain level, however, the glass assumes deliquescence which deprives the glass of its practical utility. When such a third component as zinc oxide (ZnO), alumina ($Al_2O_3$), or zirconium oxide ($ZrO_2$) is added as a stabilizer to the glass which has assumed deliquescence, it can divest the glass of the deliquescence. In the various stabilizers, i.e. ZnO, $Al_2O_3$ and $ZrO_2$, mentioned above, ZnO excels the others in spectral characteristics. FIG. 6 shows the wavenumber at which the transmission loss is minimized in the hollow-core optical waveguide having an inside diameter of 1 mm and the corresponding value of transmission loss, as the functions of the percentage composition of the three components $GeO_2$, ZnO, and $K_2O$ in the three-component system. In the graph, the continuous line indicates the wavenumber at the minimum transmission loss and the broken line the value of the minimum transmission loss. It is noted from FIG. 6 that the wavenumber tends to shift toward the lower band in proportion as the amount of $K_2O$ to be added increases and the value of transmission loss tends to increase in proportion as the amount of ZnO to be added increases. When the content of $GeO_2$, that of $K_2O$, and that of ZnO are selected respectively in the ranges of about 60 to 90 mole % about 5 to 20 mole %, and about 5 to 30 mole %, the hollow-core optical waveguide can transmit light of the middle infrared band having wavenumber of 975 cm$^{-1}$ to 900 cm$^{-1}$ with transmission loss of not more than 0.2 dB/m. Within these ranges of the three components of the germanium glass, the wavenumber 940 cm$^{-1}$ of the $CO_2$ gas laser beam is completely covered. In the region rich in $K_2O$, the transmission loss can be lowered to 0.05 dB/m.

Figure 7:
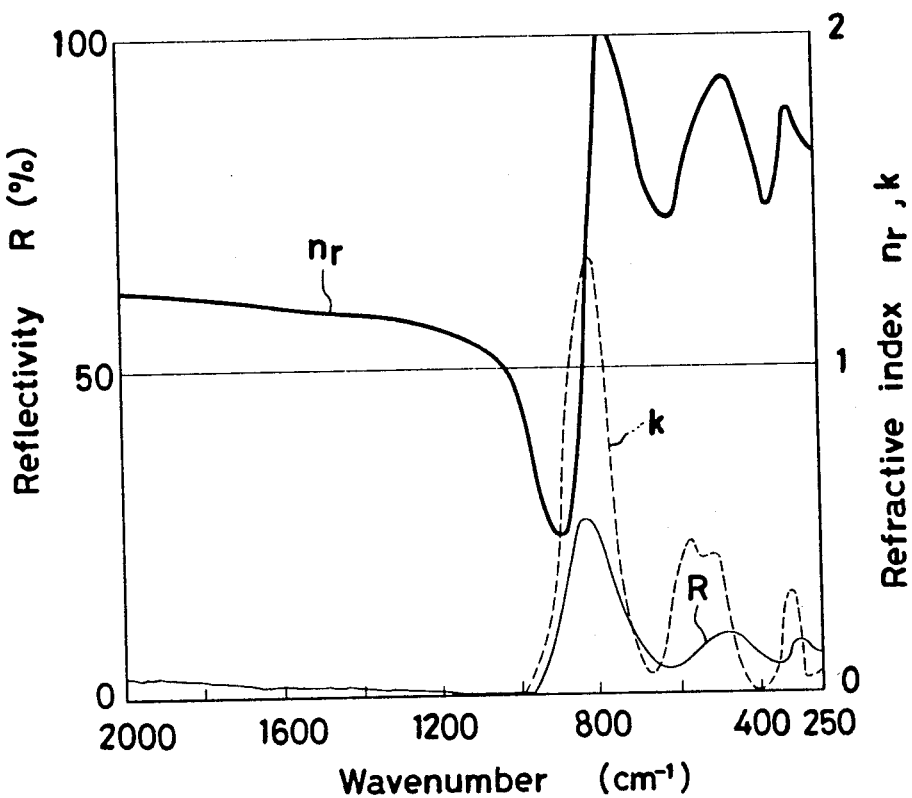
FIG. 7 is a graph showing the relation between the wavenumber of light and the refractive index of the glass consisting preponderantly of $GeO_2$ in accordance with the present invention.

FIG. 7 shows the actually found values of the real number part $n_r$ and the imaginary number part k of the refractive index $n_r - ik$ in the middle infrared region of a glass composed of 80 mole % of $GeO_2$, 10 mole % of ZnO, and 10 mole % of $K_2O$. It is noted from FIG. 7 that at the wavenumber 940 cm$^{-1}$ of $CO_2$ gas laser beam, $n_r$ is about 0.6 and k is about 0.1, namely, that $n_r < 1$ is certainly satisfied and the value of k is much smaller than its maximum value (1.3). The data indicate that at 940 cm$^{-1}$, the waveguide provides an effective reflectivity to the obliquely incident light.

Figure 8:
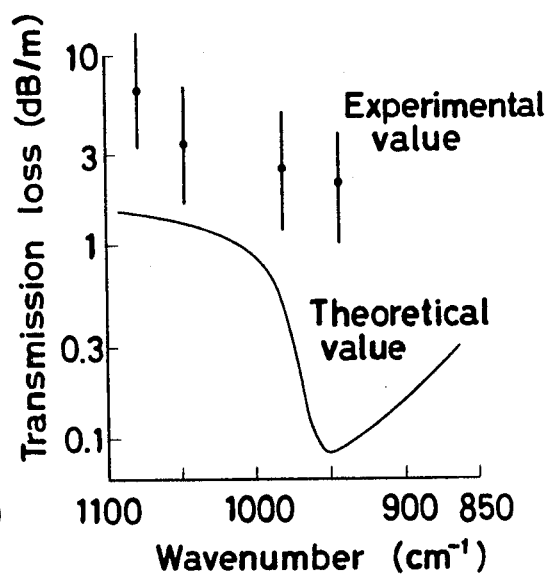
FIG. 8 is a graph showing the relation between the wavenumber of light and the transmission loss as observed when the $CO_2$ gas laser beam is transmitted through the optical waveguide of the present invention.

A hollow-core waveguide having an inside diameter of 1 mm was produced with the germanium glass of the aforementioned composition. Light of varying wavenumber was injected into this waveguide to test the waveguide for transmission loss. The found values are shown in FIG. 8 in conjunction with calculated frequency characteristics. It is noted from the graph of FIG. 8 that both calculated and found values of transmission loss depend upon the wavenumber of light to be used. This dependency may be ascribed to the fact that the refractive index and the transmission loss of $GeO_2$ depend heavily upon the wavenumber of the light. As shown in FIG. 8, the transmission loss reaches its minimum at the particular wavenumber of 940 cm$^{-1}$. The value of this minimum transmission loss is theoretically calculated to be 0.1 dB/m and was experimentally found to be about 2 dB/m.

As described above, a hollow waveguide produced by forming its clad part with glass consisting preponderantly of germanium dioxide constitutes a feasible optical fiber capable of transmitting light of the middle infrared band with low transmission loss. Further, the transmission loss can be minimized for the particular wavelength of light to be used by suitably controlling the amounts of the additive component and the stabilizing component to be incorporated in the glass.

Some of the effects of the hollow optical fiber of this invention are enumerated below.

(a) The optical fiber is not required to be formed in a two-layer construction. Thus, it can be manufactured easily and inexpensively.

(b) The optical fiber has excellent endurance with respect to a high-energy beam because it has the hollow core and, as a whole, enjoys high mechanical, thermal, and chemical stability.

(c) The optical fiber does not suffer from aggravation of loss due to deliquescence and entry of impurities (mainly water).

(d) Since the optical fiber is made of a glass oxide, it cannot undergo further degradation of quality.

(e) Since the optical fiber has a hollow core, it can be subjected to forced air cooling by passage of cooling air through the hollow core.

(f) The optical fiber does not suffer from loss due to the reflection of light on the inlet and outlet terminal faces of the fiber, because it has the hollow core.

The optical waveguide of this invention possesses many outstanding advantages as described above. Owing to these characteristics, it is expected to find utility in applications in which the conventional optical fibers have not proved amply practicable.

What is claimed is:

1. In a hollow-core optical waveguide for use in the middle infrared band, the improvement which comprises having a clad part thereof formed of glass consisting preponderantly of germanium dioxide.

2. A hollow-core optical waveguide according to claim 1, wherein the clad part thereof is formed of glass composed of 60 to 90 mole % of germanium dioxide, 5 to 20 mole % of potassium oxide, and 5 to 30 mole % of one member selected from the group consisting of zinc oxide, aluminum oxide, and zirconium oxide.

3. A hollow-core optical waveguide according to claim 1, wherein the clad part thereof is formed of glass composed of 80 mole % of germanium dioxide, 10 mole % of zinc oxide, and 10 mole % of potassium oxide.

* * * * *